Jan. 14, 1947.   W. H. SILVER   2,414,175
COULTER MOUNTING FOR LISTERS
Original Filed Sept. 12, 1940
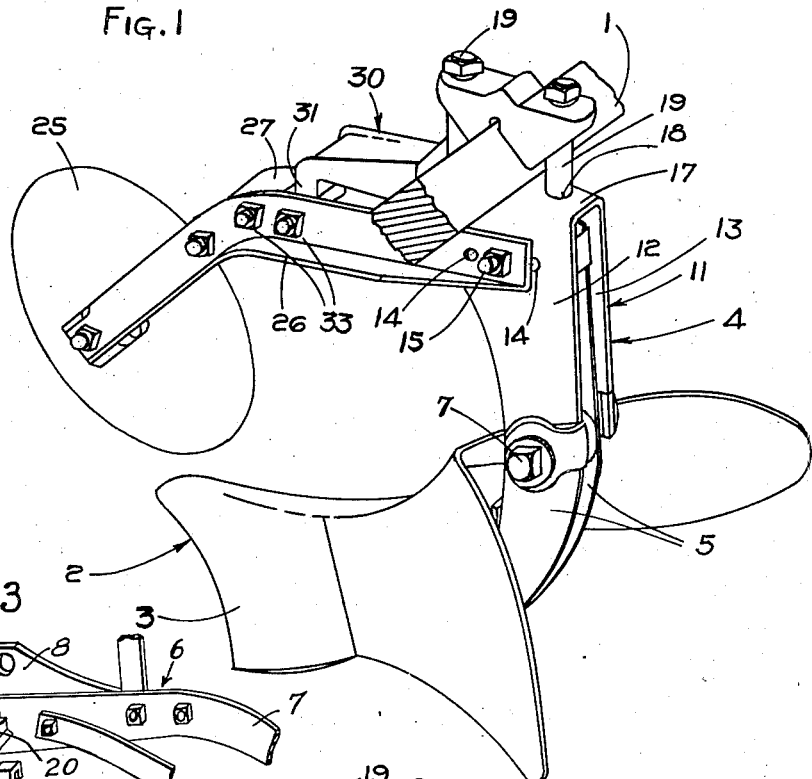
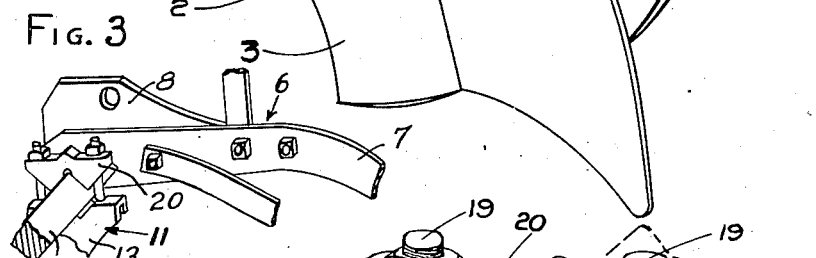
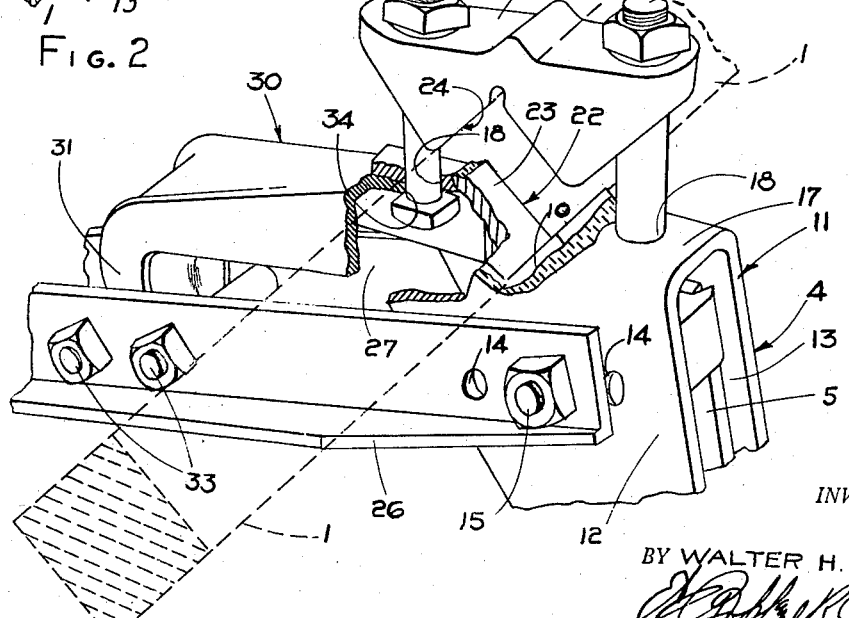
INVENTOR.
BY WALTER H. SILVER
ATTORNEYS Patented Jan. 14, 1947

2,414,175

UNITED STATES PATENT OFFICE 2,414,175

COULTER MOUNTING FOR LISTERS

Walter H. Silver, Moline, Ill., assignor to Deere & Company, Moline, Ill., a corporation of Illinois Original applications September 12, 1940, Serial No. 356,433, and June 2, 1943, Serial No. 489,583. Divided and this application May 25, 1944, Serial No. 537,325

9 Claims. (Cl. 97—209)

This application is a division of my co-pending United States applications, Serial No. 356,433, filed September 12, 1940, and Serial No. 489,583, filed June 2, 1943.

This invention relates generally to agricultural implements and more particularly to listers and bedders of the type adapted to receive a plurality of tools of different kinds and arranged in different ways to accommodate various conditions of operation.

Generally speaking, a lister or bedder of the tractor-mounted or integral type, with which the present invention is more particularly concerned, comprises a frame connected at its forward end with the tractor for generally vertical swinging movement and having a rear transverse tool bar to which the desired tools at the desired spacing are connected, together with gauge wheel means for gauging the depth of operation of the tool or tools. Usually, such implements may be arranged to serve as a two-row, three-row, or four-row machine and may receive tools for forming trenches or furrows, or for either splitting or sweeping off the tops of previously formed beds or ridges, either previous to or simultaneously with planting operations, as desired.

The object and general nature of this invention is the provision of a new and improved coulter supporting means especially constructed to accommodate adjustable tools, particularly tools that are mounted for lateral adjustment on a transverse tool bar.

These and other objects and advantages of the present invention will be apparent to those skilled in the art after a consideration of the following detailed description, taken in conjunction with the accompanying drawing illustrating the preferred form of the invention.

In the drawing:

Figure 1 is a perspective view of a rolling coulter mounted on and laterally adjustable with the beam or standard of a laterally adjustable lister bottom.

Figure 2 is a fragmentary view, showing the details of the support for the arms on which the coulter is mounted.

Figure 3 is a fragmentary view showing a portion of the implement frame.

Referring now to the drawing, the tool bar on which the tools and associated coulters are mounted for lateral adjustment is indicated by the reference numeral 1. The tool bar 1 forms a part of the frame 6 of a tractor propelled four-row middlebreaker and planter that is shown in detail in my parent application identified above, to which reference may be made if desired. The frame 6 includes a pair of generally longitudinally extending beams 7 which at their rear ends are bolted or otherwise secured to plates 8 which are welded in laterally spaced relation to the tool bar 1. The latter is preferably square in cross section and uniform in cross section so that the tools and/or other parts adapted to be attached thereto may be disposed in any one of a plurality of lateral positions, as clearly disclosed in the parent application. Each of the above-mentioned tools is indicated by the reference numeral 2 and, as best shown in Figure 1, comprises a lister bottom 3 fixed to the lower end of a supporting structure 4. Preferably, each supporting structure 4 includes a pair of standards 5, forming, at their lower ends, foot pieces to which the lister bottom 3 is connected by any suitable means. The standards are pivotally connected by an attaching bolt 9 to the lower end of a standard bracket in the form of a U-shaped member 11. The member 11 includes side portions 12 and 13 which, adjacent their upper portions, are provided with a plurality of aligned apertures 14 in any one pair of which a pivot bolt 15 is disposed.

The central portion 17 of the bracket member 11 is also provided with a pair of apertures 18 in which vertically disposed clamping bolts 19 are disposed. These bolts receive a cap 20 which is normally disposed on the upper side of the tool bar 1. The bracket member 11 is provided with a V-shaped notch, as indicated at 22, which is formed by a V-shaped part 23 that is welded or otherwise fixed to the central and side portions of the bracket member 11. The cap 20 is also provided with a V-shaped notch 24, so that when the bolts 19 are tightened the beam assembly 4 is firmly and rigidly clamped to the tool bar 1. By releasing or loosening the clamping bolts 19, the lister bottom and its supporting structure may be shifted laterally along the tool bar 1 to any position desired.

The rolling coulter is indicated by the reference numeral 25 and is mounted upon suitable journal supports between a pair of coulter arms 26 and 27. These arms preferably consist of right and left hand angle members bent so as to extend downwardly and forwardly at their front ends. The rear ends of the coulter arms 26 and 27 are apertured so as to receive the pivot bolt 15. A colter arm support 30 is provided to reenforce and strengthen the connection between the coulter and the beam 4 to which it is connected and on which it is supported. The coulter arm support 30 consists of a generally L-shaped casting having a depending portion 31 arranged to extend downwardly between the two coulter arms 26 and 27. The vertical flanges of the latter are apertured to receive a pair of clamping bolts 33, which bolts pass on opposite sides of the depending portions 31. The rear end of the casting 30, which is generally U-shaped in cross section at this point, is apertured, as at 34, to receive the lower end of the forward clamping bolt 19. The width of the rear end of the coulter arm support 30 is substantially the same as the distance between the inner faces of the bracket sides 12 and 13, and thus when the forward clamping bolt 19 is tightened the coulter arm support 30 is firmly and rigidly secured to the lister beam so as to form a part thereof. Also, the clamping bolts 33 firmly and rigidly fix the coulter arms 26 and 27 to the coulter arm support 30. This construction therefore provides a firm and rigid support for the rolling coulter 25, and further, said support is movable laterally with the associated lister bottom supporting structure 4 so that the coulter is always retained in exactly the proper position. It will be seen particularly from Figure 1 that when the clamping bolts 19 are loosened the lister bottom supporting structure 4 and the coulter may be shifted laterally to any desired position without disturbing the relation between the coulter 25 and the lister bottom 3.

While I have shown and described above a preferred structure in which the principles of the present invention have been incorporated, it is to be understood that my invention is not to be limited to the particular details shown and described above, but that, in fact, widely different means may be employed in the practice of the broader aspect of my invention.

What I claim, therefore, and desire to secure by Letters Patent is:

1. In an agricultural implement having a transverse tool bar, a generally vertical tool supporting structure fixed at its upper end to said tool bar, an arm fixed to the upper end portion of said tool supporting structure and extending forwardly thereof, a coulter supporting arm fixed at its rear end to said tool supporting structure below the upper end thereof and at its intermediate portion to said first arm, and a coulter carried at the front end of said coulter supporting arm.

2. In an agricultural implement having a transverse tool bar, a tool standard, a U-shaped member having a notch to receive said bar and spaced apart sections to receive the upper end of said tool standard, a cap and a pair of clamping bolts for securing said member to said tool bar, a pair of coulter arms secured to opposite sides of said member, a coulter arm support clamped to said tool bar by one of said clamping bolts and having an end disposed between said coulter arms, and means for securing the latter to said end of said coulter arm support.

3. In an agricultural implement having a transverse tool bar, a tool standard, a bracket to which said standard is fixed, clamping means for clamping said bracket to said tool bar including a pair of clamping bolts, one disposed on each side of said bar, an earth working tool, means fixing said tool to said standard, a coulter, and means for connecting said coulter to said bracket including a part fixed in position to the latter by at least one of said clamping bolts.

4. In an implement having a transverse tool bar and tool means shiftably connected with said tool bar, a coulter, and means for connecting said coulter to said tool means, said connecting means comprising a pair of bars fixed at opposite sides to said tool means, and a coulter support also fixed to said tool means and connected at an intermediate point with and disposed between said bars.

5. In an agricultural implement, a generally vertical tool supporting structure, clamping means for fixing said tool supporting structure to a support, a pair of coulter arms secured to opposite sides of said tool supporting structure, a coulter arm support clamped to said tool supporting structure by said clamping means and having an end disposed between said coulter arms, means for securing the latter to said end of said coulter arm support, and a coulter at the forward ends of said pair of coulter arms.

6. In an agricultural implement, a generally vertical tool supporting structure, clamping means for fixing said tool supporting structure to a support, a pair of coulter arms secured to opposite sides of said tool supporting structure adjacent the upper end thereof, a coulter arm support clamped at its rear end to the upper end of said tool supporting structure above said pair of arms, said coulter arm support having a downturned forward end disposed between said coulter arms, means for securing the latter to said downturned end of said coulter arm support, and a coulter at the forward ends of said pair of coulter arms.

7. The invention set forth in claim 6, further characterized by said pair of coulter arms extending generally horizontally from said tool supporting structure to a point beyond the downturned end of said coulter arm support.

8. The combination with a tool supporting structure, of a pair of coulter supporting arms spaced apart substantially from end to end, a coulter connected with one end of said arms, means fixing the other end of said spaced apart arms to said tool supporting structure on opposite sides thereof, and separate means disposed between and connected to said coulter arms between the coulter and said tool supporting structure.

9. The combination with a transverse tool bar and a tool supporting structure fixed to said bar, of a pair of generally forwardly extending coulter supporting arms spaced apart substantially from end to end, a coulter connected with the forward ends of said arms, means fixing the rear ends of said spaced apart arms to said tool supporting structure on opposite sides thereof, and additional means comprising a bar disposed at one end between and connected to said coulter arms between the tool bar and said coulter and fixed at its other end to said tool bar for reenforcing said coulter arms.

WALTER H. SILVER.